(12) United States Patent
Schleipen

(10) Patent No.: US 7,881,165 B2
(45) Date of Patent: Feb. 1, 2011

(54) OPTICAL SCANNING DEVICE WITH COMPACT SPHERICAL ABERRATION COMPENSATION

(75) Inventor: Johannes Joseph Hubertina Barbara Schleipen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 533 days.

(21) Appl. No.: 11/575,139

(22) PCT Filed: Sep. 12, 2005

(86) PCT No.: PCT/IB2005/052979
§ 371 (c)(1),
(2), (4) Date: Mar. 13, 2007

(87) PCT Pub. No.: WO2006/030371
PCT Pub. Date: Mar. 23, 2006

(65) Prior Publication Data
US 2008/0316901 A1 Dec. 25, 2008

(30) Foreign Application Priority Data
Sep. 16, 2004 (EP) .................. 04300605

(51) Int. Cl.
*G11B 7/00* (2006.01)
(52) U.S. Cl. .................. 369/44.23
(58) Field of Classification Search .......... None
See application file for complete search history.

(56) References Cited

U.S. PATENT DOCUMENTS

| | | | |
|---|---|---|---|
| 5,793,735 A * | 8/1998 | Oono ............... | 369/112.02 |
| 5,841,745 A * | 11/1998 | Kuhn et al. ............ | 369/44.23 |
| 5,974,020 A | 10/1999 | Ju et al. | |
| 6,002,661 A | 12/1999 | Abe et al. | |
| 6,084,842 A | 7/2000 | Miura | |
| 6,898,168 B2 | 5/2005 | Kimura et al. | |
| 7,006,411 B2 * | 2/2006 | Hirai .............. | 369/44.24 |
| 2001/0021146 A1 * | 9/2001 | Kikuchi et al. ........ | 369/44.23 |
| 2003/0007431 A1 | 1/2003 | Tateishi | |
| 2003/0053393 A1 * | 3/2003 | Shimano et al. ....... | 369/112.02 |
| 2003/0095347 A1 | 5/2003 | Kobayashi | |
| 2004/0017759 A1 | 1/2004 | Ohtaki et al. | |
| 2004/0061917 A1 * | 4/2004 | Mushika et al. ......... | 359/223 |
| 2004/0170109 A1 * | 9/2004 | Asada et al. ........ | 369/112.28 |
| 2004/0218484 A1 * | 11/2004 | Kuze et al. ............. | 369/44.23 |

(Continued)

FOREIGN PATENT DOCUMENTS

CN 1295694 C 11/2001

(Continued)

OTHER PUBLICATIONS

Written Opinion of the International Searching Authority PCT/IB2005/052979 mailed Dec. 14, 2005.

*Primary Examiner*—Peter Vincent Agustin

(57) ABSTRACT

The invention relates to an optical scanning device for scanning at least one information layer (101, 102) in an information carrier (10), comprising means (1) for generating a radiation beam (11) intended to be focused on the information layer (101, 102). A spherical aberration (SA) compensation module (40) is arranged in the light path of the radiation beam (11) and comprises a SA compensation means (41) and a reflective means (42) for folding the light path of the radiation beam (11).

17 Claims, 4 Drawing Sheets

U.S. PATENT DOCUMENTS

2005/0146998 A1 * 7/2005 Nagashima ............. 369/44.14

FOREIGN PATENT DOCUMENTS

| EP | 0756273 | A1 | 1/1997 |
| EP | 1187116 | A1 | 3/2002 |
| EP | 1365270 | | 11/2003 |
| EP | 1453045 | | 9/2004 |
| EP | 1551015 | | 7/2005 |
| WO | 9630795 | | 10/1996 |
| WO | 03049089 | | 6/2003 |

* cited by examiner

OPTICAL SCANNING DEVICE WITH COMPACT SPHERICAL ABERRATION COMPENSATION

FIELD OF THE INVENTION

The present invention relates to an optical scanning device for scanning at least one information layer in an information carrier.

The invention is particularly relevant to any optical disc apparatus for reading and/or recording data from and/or to at least one information layer carried by the optical disc. Such optical disc apparatus may be a CD (Compact Disc), a DVD (Digital Versatile Disc) or a BD (Blu-Ray Disc) player and/or recorder.

BACKGROUND OF THE INVENTION

Information carriers having a plurality of information layers are widely used. For example, certain DVDs comprise a first and a second information layer which can be scanned by means of a radiation beam intended to be focused on one of the information layers in order to read from or record to the selected information layer. The expression "scanning" means either reading or writing data from or to an information layer.

An optical scanning device for scanning such a dual-layer DVD usually comprises means for generating a diverging radiation beam, a collimator for converting this diverging beam into a parallel radiation beam and an objective lens for focusing said parallel radiation beam on one of the two information layers. The optical scanning device further comprises an actuator for axially moving the objective lens in order to focus the radiation beam on the desired information layer.

It should be noted that when the objective lens is moved to switch from one information layer to the other a certain amount of spherical aberration (SA) is introduced. However, the numerical aperture of the radiation beam is relatively low resulting in an amount of spherical aberration within the tolerances of the optical scanning device, so that no spherical aberration compensation is needed. Actually, the amount of aberration is proportional to the fourth power of the numerical aperture of the beam, which means that a slight increase in the numerical aperture leads to a large increase in the amount of spherical aberration.

At present, the trend is to increase the numerical aperture of the radiation beam in order to reduce the size of the focus spot on the selected information layer and thus increase the storage capacity of data of the information layer. Actually, the diameter of the focus spot is inversely proportional to the numerical aperture. As a consequence, the amount of aberration introduced when switching from one information layer to another is such increased that it needs to be compensated.

It is worth noting that this need for SA compensation also applies to information carrier having only one information layer as in CD/DVD/BD compatible optical scanning devices where changing from one mode to another introduces undesired spherical aberration.

A prior art optical scanning device capable of compensating for SA aberration is shown in FIG. 1. Several mechanisms of SA compensation are known from literature:

Spherical aberration generating liquid crystal (LC) cell. Before the radiation beam is being focused on the disc 10 by the objective lens 6, spherical aberration is added to the wavefront compensating for the amount of spherical aberration due to the changing cover layer thickness. This can be done by locally changing the optical path in accordance with the change of information layer, for example by means of switching a liquid crystal in a LC cell 13.

The drawbacks of this solution for SA compensation are: it is difficult to make for small pupil radii and intolerant to pupil displacement during radial tracking due to coma effect. As a result, the LC cell should be attached to the tracking actuator which is difficult to carry out for small form factor optical drives, because the weight on the tracking actuator would deteriorate the system performance.

Variable object conjugate distance. This method of SA compensation consists of generating spherical aberration inside the objective lens 6 itself. This can be achieved by changing the conjugate of the objective by adjusting the position of the collimator 4.

The drawback of this solution is that for regular light path geometries with collimator having focal lengths of several millimeters it results in a rather large collimator displacement, typically several millimeters in high numerical aperture light path, which again is difficult to carry out in a small form factor optical drive.

SUMMARY OF THE INVENTION

It is an object of the invention to provide an optical scanning device which would lead to a high SA compensation applicable to any SA compensation technique and compatible with the requirements imposed by small form factor optical drives.

To this end, the invention proposes an optical scanning device for scanning at least one information layer in an information carrier, comprising means for generating a radiation beam intended to be focused on said information layer and a spherical aberration (SA) compensation module arranged in the light path of said radiation beam and comprising a SA compensation means and a reflective means for folding the light path of said radiation beam.

An advantage of the invention is that the use of a folding means makes it possible to reduce the overall light path by a factor of 2 and make the optical scanning device more compact than that known from prior art. In addition, said compensation module may be carried out with any SA compensation means be it an optical path length compensation means or a conjugate changing compensation means.

In a particular embodiment, said reflective means faces a beam splitter so as to reflect towards said information layer through said beam splitter the light path of said radiation beam coming out from said beam splitter.

Optical path length compensation means may be either a classical switching LC cell or a discrete step phase plate. In this latter case, a correction lens must be provided so as to ensure focusing of the radiation beam on the relevant phase step.

Due to the possible occurrence of coma effect associated with the optical path length compensation means, one may preferably use conjugate changing compensation means.

In a preferred embodiment, said conjugate changing compensation means comprises a SA correction lens. The advantage of this embodiment is to allow the use of SA correction lens having a short focal length leading to a short full stroke of the compensation means so making a compact light path geometry feasible. Furthermore, it should be noted that the numerical aperture is high in accordance with one goal of the invention. However, this feature is not detrimental to rim intensities insofar as the focal length of the SA correction lens does not influence the rim intensities, which are independently determined by the focal length of the collimator.

In order to make the optical scanning device even more compact, the invention provides that said optical device comprises detection means of an information detection beam, a grating being arranged in said information detection beam and said detection means being placed in the focal plane of said SA correction lens. Actually, this provision enables the detection means to be placed in the focal plane of the SA correction lens next to the reflecting means of the compensation module. Thus being integrated to the compensation module, the detection means do not take up more space that the compensation module itself.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
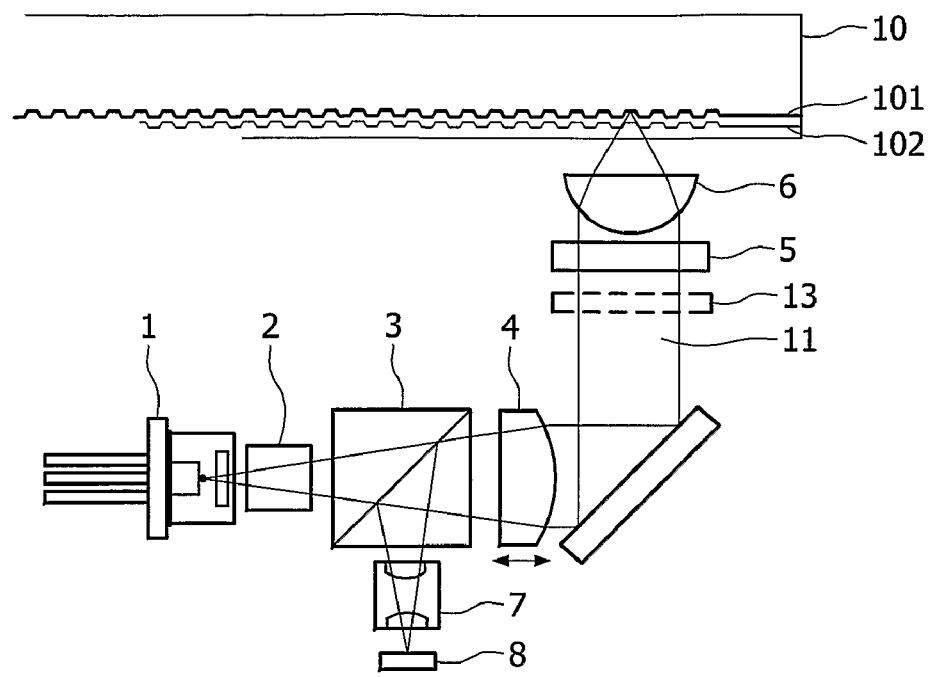
FIG. 1 illustrates a conventional optical scanning device capable of compensating for spherical aberration (SA)
Figure 2:
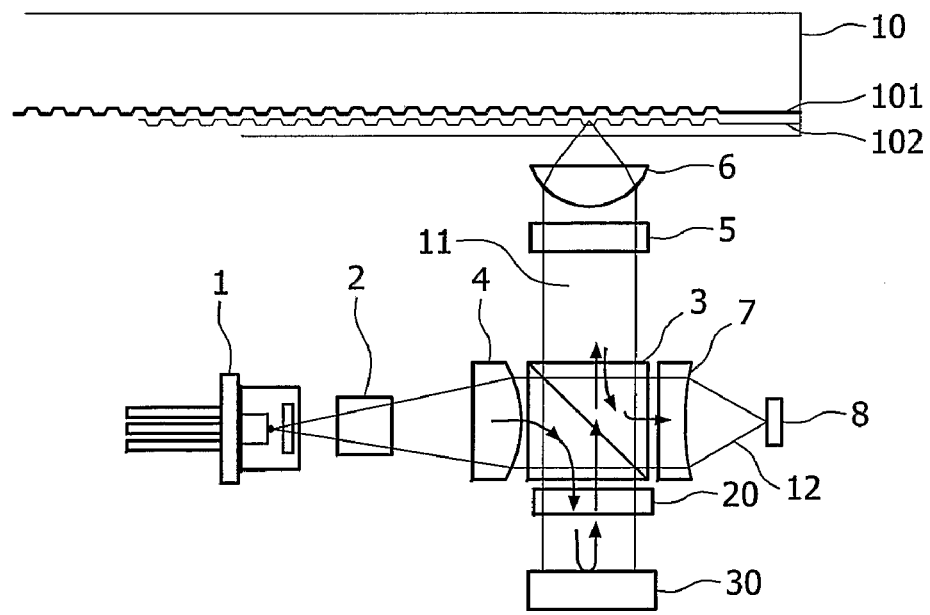
FIG. 2 shows a general representation of an optical scanning device in accordance with the invention.

A general representation of an optical scanning device in accordance with the invention is depicted in FIG. 2.

In the embodiment shown in FIG. 2, such an optical scanning device is designed for scanning two information layers 101 and 102 in an information carrier, 10. The information carrier 10 may of course have more than two information layers and even only one when the optical scanning device is incorporated in players and recorders compatible with CD, DVD and BD formats for instance.

The optical scanning device of FIG. 2 comprises a radiation source 1, a laser diode for example, for producing a radiation beam 11 intended to be focused on said information layers 101 and 102. The light emitted by the radiation source 1 passes through an optional beam shaper 2, a collimator 4 for producing a parallel radiation beam, and a polarising beam splitter 3. Focusing of the radiation beam 11 on the information carrier 10 is performed by an objective lens 6 which is controlled to allow focus switching from layer 101 to layer 102 and vice versa. References 5 and 20 relates to quarter wave plates required for polarising light properly with respect to the polarising beam splitter 3.

Information stored in the information layers 101 and 102 can be read by a detector 8 on which an information beam 12 arising from the information carrier 10 is focused by a servo-optics 7. The detector 8 together with the servo-optics 7 is capable of generating an error signal to be applied to the objective lens 6 in order to control tracking of the selected information layer by the objective lens 6.

As can be seen in FIG. 2, a SA compensation module 30 is arranged in the light path of said radiation beam 11 so as to compensate for the spherical aberration that may appear when switching from one information layer to the other.

Generally speaking, this SA compensation module 30 comprises a SA compensation means and a reflective means for folding the light path of the radiation beam 11.

In the embodiment of FIG. 2, said reflective means faces the beam splitter 3 so as to reflect towards said information layer through said beam splitter the light path of the radiation beam coming out of the beam splitter 3.

It will be understood that, contrary to prior art light paths, the laser beam now passes the polarising beam splitter 3 twice before being focused on the information carrier 10, having the advantage of making the system compact since the reflective means reduces the light path by a factor of 2.

Figure 3:
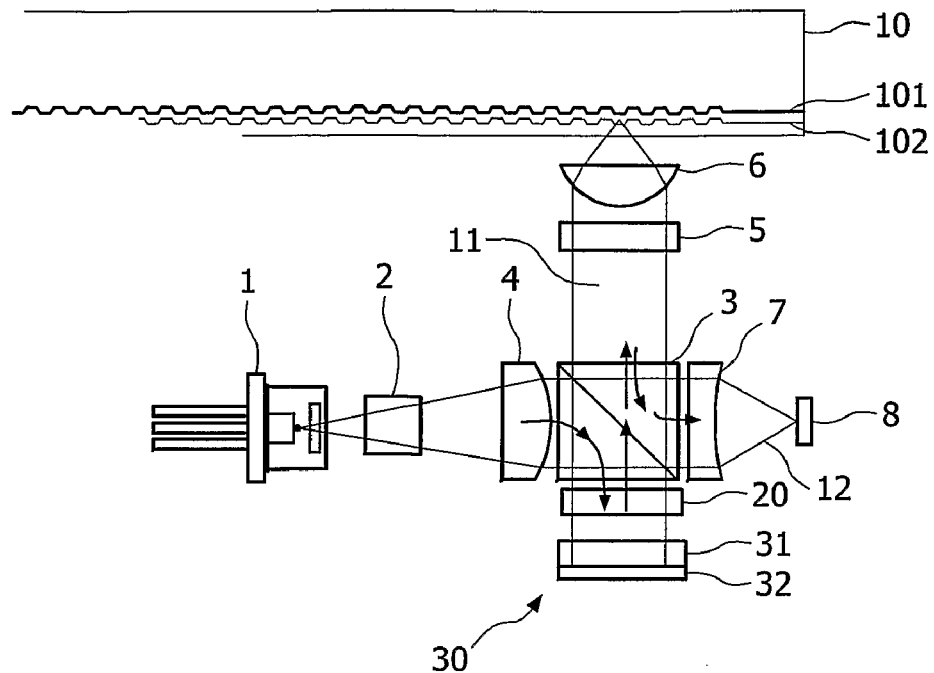
FIG. 3 shows an embodiment of the optical scanning device of FIG. 2 involving a switching liquid crystal cell.
Figure 4:
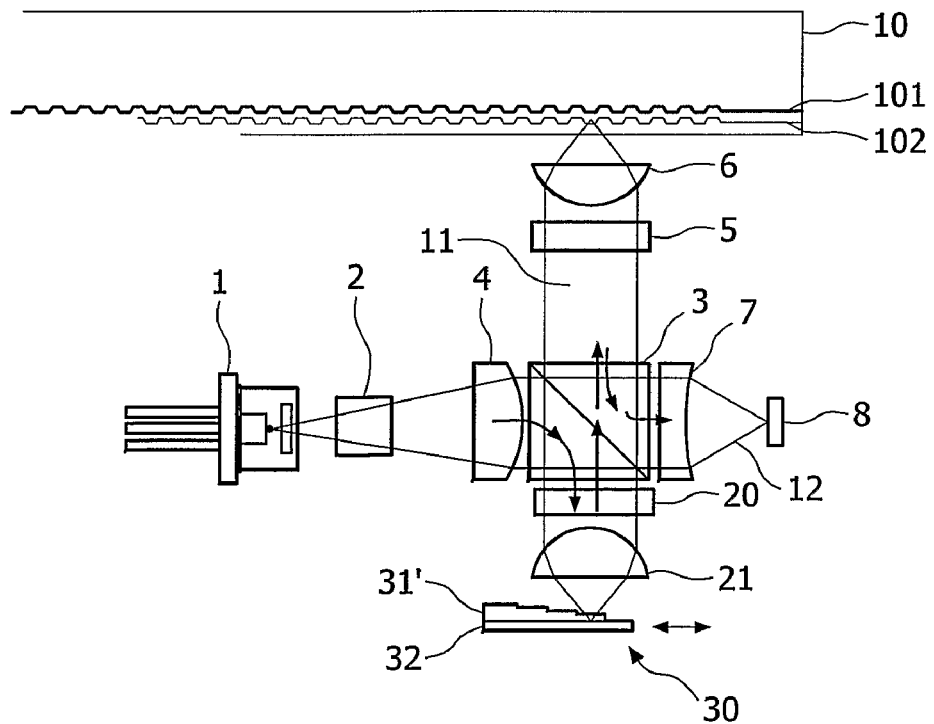
FIG. 4 shows an embodiment of the optical scanning device of FIG. 2 involving a discrete step phase plate.

FIGS. 3 and 4 relates to optical scanning devices in accordance with the invention making use of SA compensation means consisting of optical path length compensation means.

In the embodiment represented in FIG. 3, the compensation module 30 comprises a switching LC cell 31 associated with a plane mirror 32 acting as reflective means.

The compensation module 30 of the embodiment of FIG. 4 comprises a discrete step phase plate 31' also associated with a plane mirror 32, said discrete step phase plate 31' being placed inside a preferably high numerical aperture light beam focussed by means of a lens 21.

As has been mentioned earlier, both methods are less favourable because of the limited radial stroke of the actuator due to coma effect. In principle, this could be solved by using a radially rigid light path attaching the compensation means to the radial actuator.

Another solution to overcome this issue is the use of a conjugate changing compensation means instead of a path length compensation means.

FIGS. 5 to 8 show embodiments with a SA compensation module involving a conjugate changing compensation means.

Figure 5:
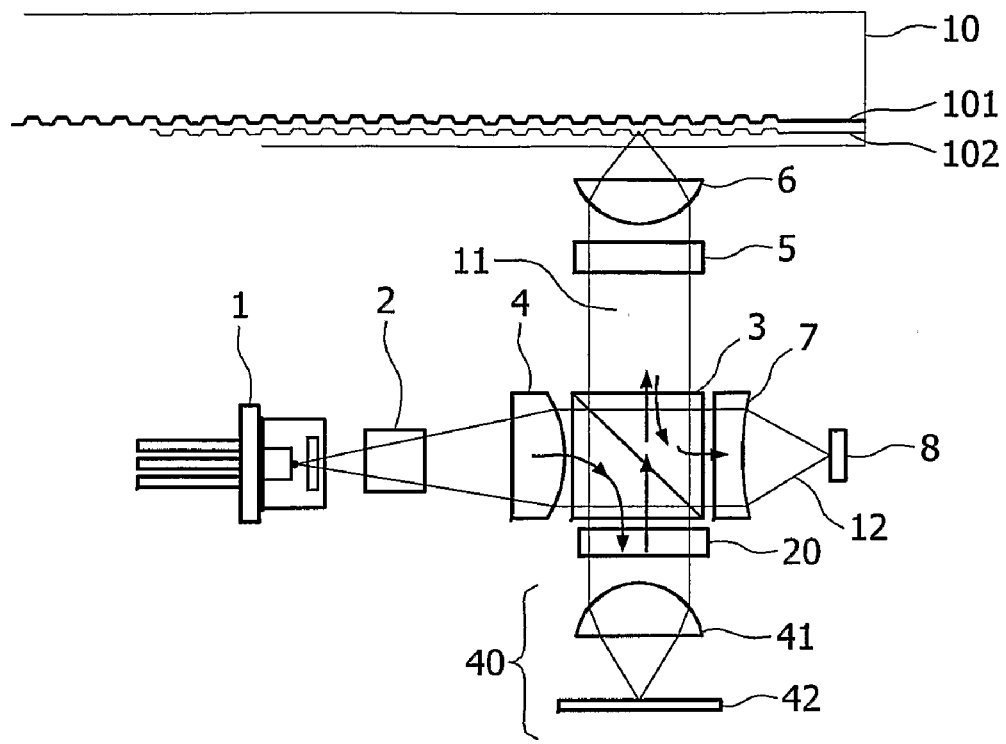
FIG. 5 shows a general representation of the optical scanning device of FIG. 2 involving conjugate changing compensation means.

In a general way, as depicted in FIG. 5, the SA compensation module 40 comprises a conjugate changing compensation means basically comprising a SA correction lens 41, and a plane mirror 42. The required SA compensation is achieved by modifying the respective focusing of the SA correction lens 41 and the plane mirror 42. Details will be given afterwards in connection with FIGS. 6a to 6c.

As previously mentioned, the focal length of the SA correction lens 41 does not influence the rim intensities and in principle may be as small as can be. For example, using a lens with a focal length of 2 mm would require a full stroke of 130 μm for compensating SA when switching from one layer to an adjacent layer of a BD disc, so making a compact light path geometry feasible for the optical scanning device. Rim intensities are determined by the collimator 4 the focal length of which may be as large as needed.

Also, the use of a small focal length for the correction lens 41 allows high numerical aperture in accordance with the general goal aimed at for optical scanning devices relative to the size of the light spot focussed on the information layers.

Figures 6A, 6B, 6C:
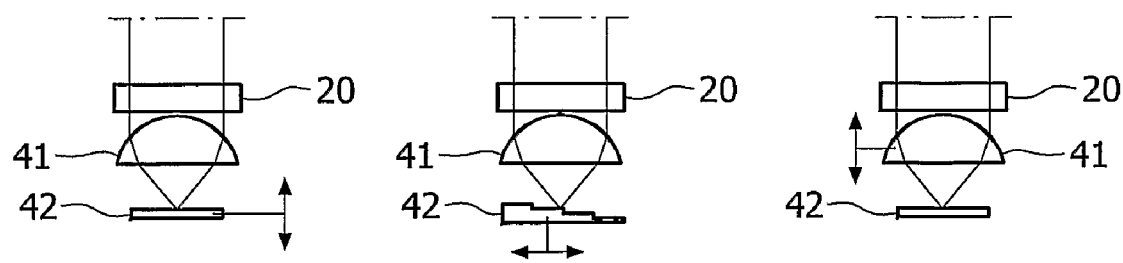
FIGS. 6a to 6c show embodiments for the conjugate changing compensation means of FIG. 5.

FIGS. 6a to 6c show several different means of changing the conjugate using this concept.

In FIG. 6a the mirror 42 is actuated in a vertical direction while the correction lens 41 is fixed. In FIG. 6b, the correction lens 41 is still fixed but the mirror 42' is slightly wedged shaped and moved in a horizontal direction. In FIG. 6c, the SA correction lens 41 is actuated along the optical axis, the mirror 42 being fixed.

Figure 7A:
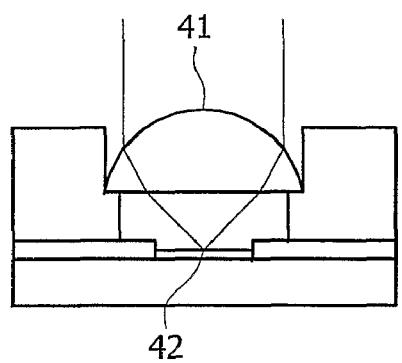
FIGS. 7a to 7c show a specific switching device for the embodiment of FIG. 6c.
Figure 7B:
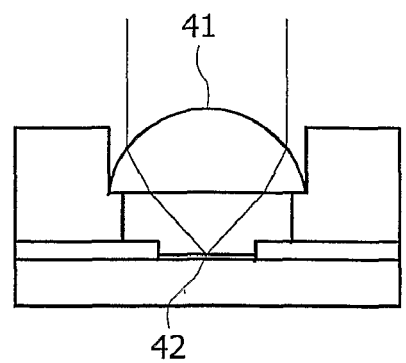
Figure 7C:
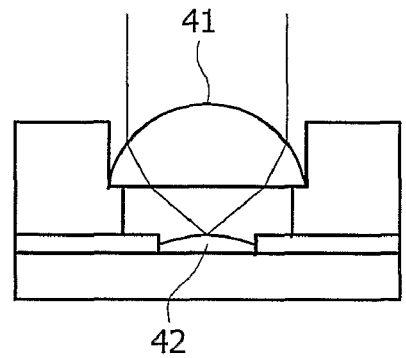

With reference to the embodiment of FIG. 6a, it should be noted that when the focal length is very small (order of 1 mm) the required stroke of the mirror 42 becomes several tens of microns and the switching may be achieved by using a MEMS (MicroElectroMechanical System) mirror device as shown in FIGS. 7a to 7c. A small 1 mm diameter lens 41 may be mounted on top of the substrate of a small MEMS membrane mirror device 42. The active area of the MEMS mirror should be optically flat to prevent from introducing higher order aberrations. Furthermore, it should be highly reflective so as to prevent absorption of the focussed light beam and subsequent damaging of the mirror membrane.

Figure 8:
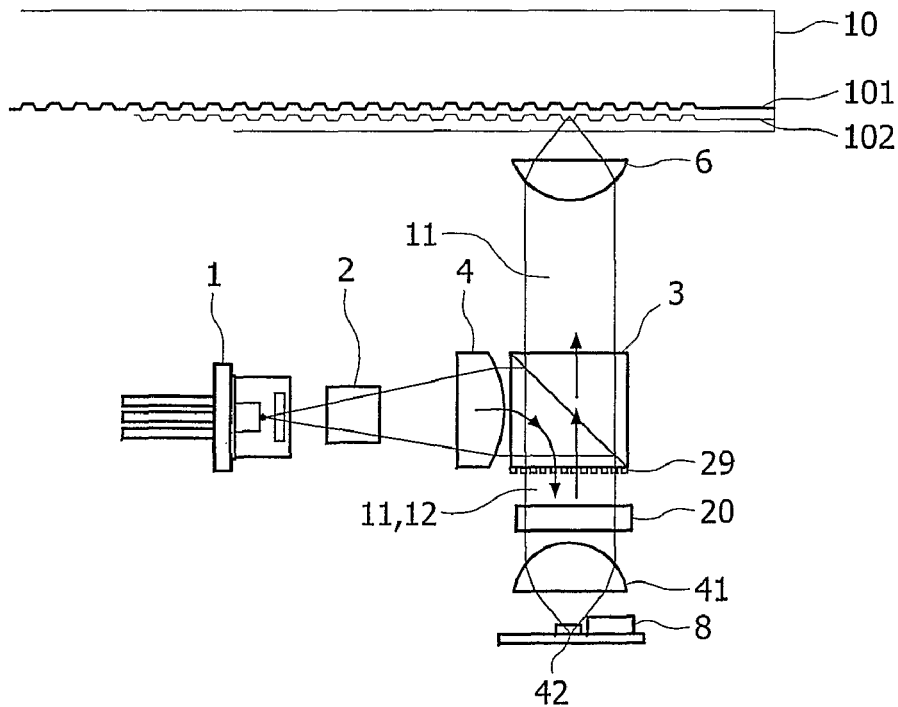
FIG. 8 shows an embodiment of the optical scanning device of FIG. 5 involving a grating.

In order to make the optical scanning device even more compact, one could combine detection with the SA correction branch as depicted in FIG. 8. For that purpose, the quarter wave plate 5 has been omitted and the information beam 12 after being reflected from the information carrier 10 is transmitted by the polarising beam splitter 3. Next, it encounters a polarisation sensitive grating structure 29 suitable for coupling the first order diffraction light to a detector 8 that is positioned next to the MEMS mirror device 42. By using the appropriate grating structure and detector geometry, one can take care of radial and focus tracking.

Any reference sign in the following claims should not be construed as limiting the claim. It will be obvious that the use of the verb "to comprise" and its conjugations does not exclude the presence of any other elements besides those defined in any claim. The word "a" or "an" preceding an element does not exclude the presence of a plurality of such elements.

The invention claimed is:

1. An optical scanning device for scanning at least one information layer in an information carrier, the device comprising:
   a radiation source for generating a radiation beam to be focused on said information layer; and
   a spherical aberration (SA) compensation module arranged in a path of said radiation beam for compensating for SA and directing the path of the radiation beam to the at least one information layer, the SA compensation module comprising a SA compensator and a reflector,
   wherein a direction of the path of said radiation beam between the radiation source and the SA compensation module is changed approximately 90 degrees and between the SA compensation module and the at least one information layer is changed approximately 180 degrees.

2. The optical scanning device as claimed in claim 1, comprising a beam splitter, wherein said reflector faces the beam splitter so as to reflect towards said information layer through said beam splitter, the path of said radiation beam coming out from said beam splitter.

3. The optical scanning device as claimed in claim 1, wherein said SA compensator is an optical path length compensator.

4. The optical scanning device as claimed in claim 3, wherein said optical path length compensator is a switching liquid crystal cell.

5. The optical scanning device as claimed in claim 3, wherein said optical path length compensator is a discrete step phase plate.

6. The optical scanning device as claimed in claim 1, wherein said SA compensation module is a conjugate changing compensation module.

7. The optical scanning device as claimed in claim 6, wherein said conjugate changing compensation module comprises an SA correction lens.

8. The optical scanning device as claimed in claim 7, wherein said SA compensation module comprises a module for moving said SA correction lens along the optical axis of said radiation beam.

9. The optical scanning device as claimed in claim 7, wherein said optical device comprises a detector of an information detection beam, a grating being arranged in said information detection beam and said detector being placed in the focal plane of said SA correction lens.

10. The optical scanning device as claimed in claim 8, wherein said reflector includes a plane mirror and said SA compensation module includes a module for moving said plane mirror along the optical axis of said radiation beam, and wherein the reflector includes a wedged mirror and said SA compensation module includes a module for moving said wedged mirror perpendicular to the optical axis of said radiation beam, and wherein said optical device comprises a detector of information detection beam, a grating being arranged in said information detection beam and said detector being placed in the focal plane of said SA correction lens.

11. The optical scanning device as claimed in claim 7, wherein said reflector is a plane mirror and said SA compensation module comprises a module for moving said plane mirror along the optical axis of said radiation beam.

12. The optical scanning device as claimed in claim 7, wherein said reflector is a wedged mirror and said SA compensation module comprises a module for moving said wedged mirror perpendicular to the optical axis of said radiation beam.

13. The optical scanning device as claimed in claim 1, wherein said SA compensation module includes an optical path length compensator and a switching liquid crystal cell, and wherein said reflector includes a plane mirror and said SA compensation module includes a module for moving said plane mirror along the optical axis of said radiation beam, and wherein the reflector includes a wedged mirror and said SA compensation module includes a module for moving said wedged mirror perpendicular to the optical axis of said radiation beam, and wherein said optical device comprises a detector of an information detection beam, a grating being arranged in said information detection beam and said detector being placed in the focal plane of said SA correction lens.

14. The optical scanning device of claim 1, comprising a light detector, wherein the radiation beam path from the radiation source to the light detector passes at least twice through the SA compensator.

15. The optical scanning device of claim 14, wherein the radiation beam path from the radiation source to the light detector passes three times through the SA compensator.

16. An optical scanning device for scanning at least one information layer in an information carrier, the device comprising:
   a radiation source for generating a radiation beam to be focused on said information layer;
   a spherical aberration (SA) compensation module arranged in a path of said radiation beam for compensating for SA and directing the path of the radiation beam to the at least one information layer, the SA compensation module comprising an SA compensator and a reflector;
   a splitter; and
   a light detector arranged in the path of the radiation beam opposite the radiation source, the beam passes at least twice through the splitter.

17. The optical scanning device of claim 16, wherein the radiation beam path from the radiation source to the light detector passes three times through the SA compensator.

* * * * *